(12) United States Patent
Liao et al.

(10) Patent No.: US 11,277,212 B2
(45) Date of Patent: Mar. 15, 2022

(54) METHOD AND ACTIVE ANTENNA SYSTEM IN TELECOMMUNICATION NETWORKS

(71) Applicant: Telefonaktiebolaget LM Ericsson (publ), Stockholm (SE)

(72) Inventors: Jichang Liao, Sollentuna (SE); Youping Su, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/977,091

(22) PCT Filed: Apr. 5, 2018

(86) PCT No.: PCT/SE2018/050356
§ 371 (c)(1),
(2) Date: Aug. 31, 2020

(87) PCT Pub. No.: WO2019/194709
PCT Pub. Date: Oct. 10, 2019

(65) Prior Publication Data
US 2020/0412461 A1 Dec. 31, 2020

(51) Int. Cl.
*H04B 17/12* (2015.01)
*H04B 17/14* (2015.01)
*H01Q 1/24* (2006.01)
*H01Q 21/00* (2006.01)

(52) U.S. Cl.
CPC ............ *H04B 17/12* (2015.01); *H01Q 1/246* (2013.01); *H01Q 21/00* (2013.01); *H04B 17/14* (2015.01)

(58) Field of Classification Search
CPC ...................................................... H04B 17/12
See application file for complete search history.

(56) References Cited

U.S. PATENT DOCUMENTS

| | | | |
|---|---|---|---|
| 5,499,031 A * | 3/1996 | Bodonyi | H01Q 3/267 342/174 |
| 9,035,828 B2 | 5/2015 | O'Keeffe et al. | |
| 2004/0142729 A1 * | 7/2004 | Yuda | H04B 17/20 455/562.1 |

(Continued)

FOREIGN PATENT DOCUMENTS

| | | |
|---|---|---|
| EP | 1335450 A1 | 8/2003 |
| JP | 2004260435 A | 9/2004 |
| JP | 2005051553 A | 2/2005 |

OTHER PUBLICATIONS

International Search Report and Written Opinion for International Application No. PCT/SE2018/050356, dated Dec. 5, 2018, 12 pages.

*Primary Examiner* — Hsinchun Liao
(74) *Attorney, Agent, or Firm* — NDWE LLP

(57) ABSTRACT

A method for calibrating an active antenna system (AAS). The AAS comprises a radio unit and an antenna array. The radio unit comprises a plurality of transceiver branches. The method comprises calibrating at least one, but less then all, out of the plurality of transceiver branches as reference branch or branches. The method further comprises calibrating non-calibrated transceiver branch or branches out of the plurality of transceiver branches while the antenna array and the radio unit are connected. The disclosure further relates to a method for onsite automatic maintenance of an active antenna system, and to an active antenna system.

8 Claims, 3 Drawing Sheets

(56) References Cited

U.S. PATENT DOCUMENTS

| | | | |
|---|---|---|---|
| 2009/0196365 A1* | 8/2009 | Takano | H04L 25/0206 375/260 |
| 2010/0127932 A1* | 5/2010 | Heikkinen | H04B 17/21 342/374 |
| 2017/0034021 A1* | 2/2017 | Petrucci | H04B 1/082 |
| 2017/0346182 A1* | 11/2017 | Martikkala | H01Q 21/00 |

* cited by examiner

US 11,277,212 B2

METHOD AND ACTIVE ANTENNA SYSTEM IN TELECOMMUNICATION NETWORKS

CROSS-REFERENCE TO RELATED APPLICATIONS

This application is a National stage of International Application No. PCT/SE2018/050356, filed Apr. 5, 2018, which is hereby incorporated by reference.

TECHNICAL FIELD

The present disclosure relates to a method for calibrating an active antenna system, to a method for onsite automatic maintenance of an active antenna system, and to an active antenna system.

BACKGROUND ART

Base stations can comprise several transceiver branches. There are, for example, traditional base stations comprising two or four transceiver branches on the market. These base stations are usually calibrated and tested in a factory in connection to their production. Usually, each transceiver branch is calibrated and tested in the factory prior delivery of the base station to a customer. The testing and calibrating can be performed by connecting a factory test bench to the respective transceiver branch.

Modern base stations, such as base stations comprising an active antenna system, AAS, can comprise 32, 64, 128, or even more transceiver branches. Testing and calibrating each transceiver branch in such an AAS will take more and more time due to the increased number of transceiver branches. As an example, an AAS containing 64 transceiver branches will approximately require 32 times as much calibration time and/or testing time as a base station containing only two transceiver branches.

Further, transceiver branches in base stations, as any other component, inevitably suffer from a certain fail rate. If the fail rate for a specific transceiver branch is the same for a traditional base station and for a base station comprising an AAS, the whole base station comprising the AAS will have a higher fail than a traditional base station due to the fact that a base station comprising an AAS has a higher number of transceiver branches. Sticking to the above example, assuming no other failures than transceiver branch failures, and assuming a low fail rate for a transceiver branch, a base station containing an AAS with 64 receiver branches might have a fail rate of 32 times the fail rate of a traditional base station comprising only two transceiver branches, although the individual fail rate of a transceiver branch is the same.

SUMMARY OF THE INVENTION

It is an objective of the present disclosure to provide a method and an active antenna system, AAS, which mitigate, alleviate, or eliminate at least some of the above named disadvantages.

According to a first aspect, this is achieved by a method for calibrating an active antenna system, AAS. The AAS comprises a radio unit and an antenna array. The radio unit comprises a plurality of transceiver branches. The method comprises the step of calibrating at least one, but less then all, out of the plurality of transceiver branches as reference branch/-es. The method further comprises the step of calibrating non-calibrated transceiver branch/-es out of the plurality of transceiver branches while the antenna array and the radio unit are connected.

The calibration of the reference branches can be performed as in prior art, or in any other way. However, when the antenna array and the radio unit are connected, no connecting of a factory test bench is needed for the calibration of the remaining branches. This reduces time during production and thus reduces production costs. Further, the calibration of the remaining branches can be automatised. Thus, a facilitated calibration is achieved.

In one example, the step of calibrating non-calibrated transceiver branches comprises the step of determining whether the radio unit and the antenna array are properly connected. The step of calibrating further comprises in this example the step of calibrating the non-calibrated transceiver branch/-es in case it has been determined that the radio unit and the antenna array are properly connected. This further reduces fault rates since it is assured that the calibration will only be performed under good calibration conditions.

In one example, the radio unit further comprises a calibration branch. The step of determining whether the radio unit and the antenna array are properly connected comprises the step of sending a test signal between the calibration branch and the reference branch/-es. The step of determining whether the radio unit and the antenna array are properly connected further comprises the step of determining whether the radio unit and the antenna array are properly connected based on that sent test signal. This is a specific implementation of determining the proper connection which is comparatively easy to implement and thus further helps in reducing manufacture costs.

In one example, the method further comprises the step of saving information regarding properties of the radio unit obtained during calibrating the reference branch/-es. The determining whether the radio unit and the antenna array are properly connected is also based on the saved information regarding properties of the radio unit. This facilitates, for example, comparatively easy re-calibration. This facilitates especially performing re-calibration "on the field" without the need to transport the AAS back to a controlled environment in, for example, a factory, thus further reducing maintenance costs.

In one example, the information regarding properties of the radio unit relates to one or more of the following quantities: VGA behaviour of a receiver in each reference branch, gain of the receiver in each reference branch, frequency response of the receiver in each reference branch, parameters regarding amplitude, time, and/or phase of the automatic gain control, AGC, VGA behaviour of a transmitter in each reference branch, gain of the transmitter in each reference branch, frequency response of the transmitter in each reference branch, gain of the transmitter observing receiver, TOR, in each reference branch, the frequency response of the TOR in each reference branch. This helps achieving good (re-)calibration results.

In one example, the step of calibrating each reference branch is performed while the antenna array and the radio unit are not connected. This allows for an easy connection of a test bench system. This can facilitate calibrating the reference branch/-es according to prior art calibration.

According to a second aspect, this is achieved by a method for onsite automatic maintenance of an active antenna system, AAS. The AAS comprises a radio unit and an antenna array. The radio unit comprises a plurality of transceiver branches. The method comprises the step of performing a self-test of the active antenna system. The method further comprises the step of determining whether the active antenna system deviates from normal operation based on the self-test. The method even further comprises the step of determining whether a recalibration of the active antenna system can bring the active antenna system back to normal operation in case it is determined that the active antenna system deviates from normal operation. The method even further comprises the step of, in case it is determined that a recalibration of the active antenna system can bring the active antenna system back to normal operation, calibrating the active antenna array system according to the calibration method of the present disclosure.

This allows an automatic onsite maintenance of an AAS. This allows a self-repair mechanism of the AAS. Thus, the need for service technicians is reduced. Thus, maintenance cost is reduced. Operating time is increased.

In one example, the method further comprises the step of closing at least one transceiver branch of the active antenna system in case it is determined that a recalibration of the active antenna system cannot bring the active antenna system back to normal operation. This further reduces maintenance cost. Closing of a branch can bring the AAS back into a known state where the AAS can operate probably slightly less efficient due to the closed branch, but under controlled conditions. By bringing the system into a controlled state/keeping it into a controlled state, the AAS can continue operation without the (immediate) need for a service technician. Thus, maintenance cost is further reduced. Operating time is further increased.

According to a third aspect, this is achieved by an active antenna system, AAS. The AAS comprises a radio unit and an antenna array. The radio unit comprises a plurality of transceiver branches. The active antenna system is arranged to perform onsite automatic maintenance according to the method of the present disclosure.

Such an AAS has the advantages described in relation to the corresponding method.

BRIEF DESCRIPTION OF THE DRAWINGS

Example embodiments are described in more detail in relation to the following figures. Throughout the figures, unless not otherwise stated, same reference numerals denote same elements, although the elements might not be repeatedly described in relation to all figures.

In the following.

DETAILED DESCRIPTION

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Figure 1:
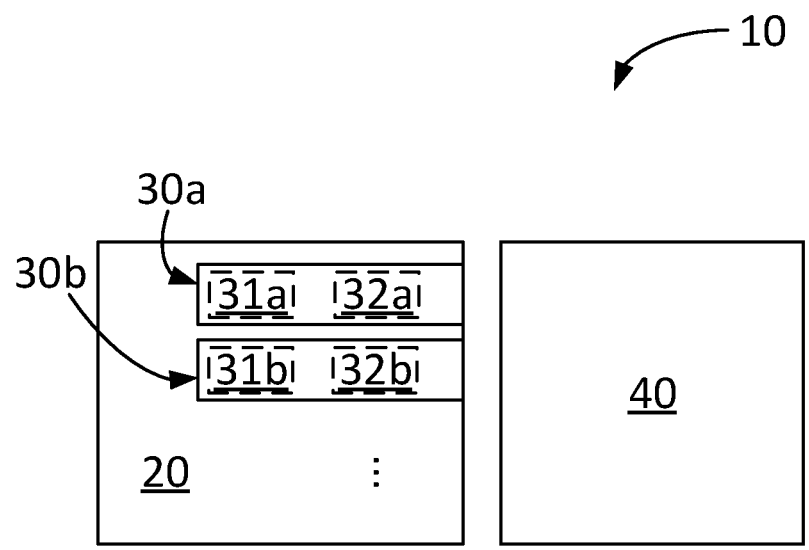
FIG. 1 depicts schematically an embodiment of an active antenna system.
Figure 4A:
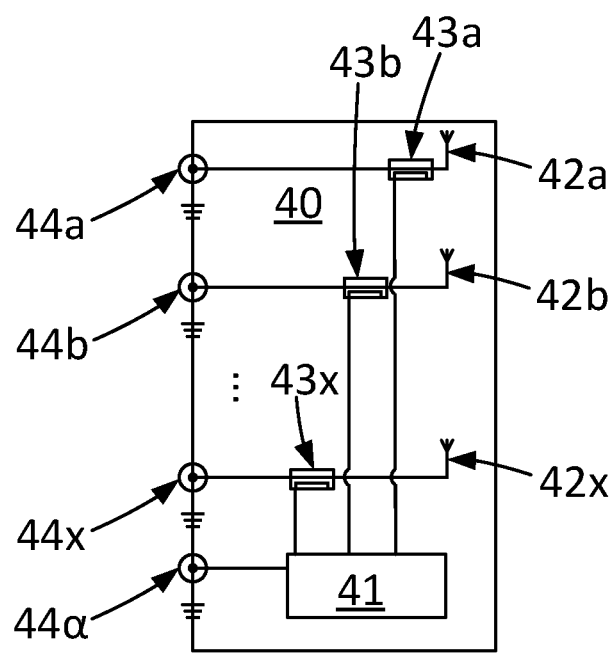
FIG. 4a depicts schematically an embodiment of an antenna array.
Figure 4B:
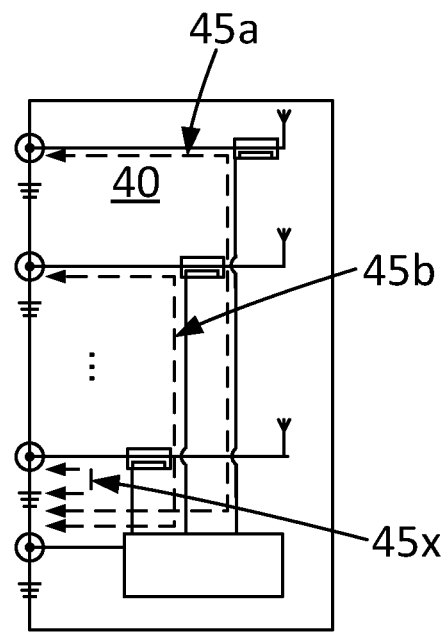
FIG. 4b depicts schematically an embodiment of an antenna array indicating signal flow.

FIG. 1 depicts schematically an embodiment of an active antenna system 10, AAS 10. The AAS 10 comprises an antenna array 40. An embodiment of an antenna array is depicted in FIG. 4a-b and will be described in more detail later on. The AAS 10 comprises a radio unit 20. The radio unit 20 comprises a plurality of transceiver branches 30a, 30b, . . . Each of the transceiver branches 30a, 30b, . . . can comprise a corresponding transmitter 31a, 31b, . . . Each of the transceiver branches 30a, 30b, . . . can comprise a corresponding receiver 32a, 32b, . . . A possible embodiment of a radio unit 20 is depicted and described in greater detail in relation to FIG. 2.

Figure 5A:
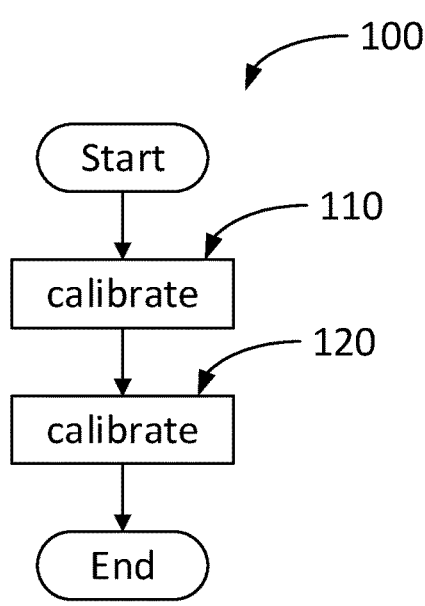
FIG. 5a depicts a flowchart of an example of a method for calibration.

The AAS 10 can be arranged to perform a method 100 for calibration, described in greater detail in relation to FIG. 5a. The AAS 10 can be arranged to perform a method 199 for calibration, described in greater detail in relation to FIG. 5b. The AAS 10 can be arranged to perform a method 200 for onsite automatic maintenance of an active antenna system, described in greater detail in relation to FIG. 6.

Figure 2:
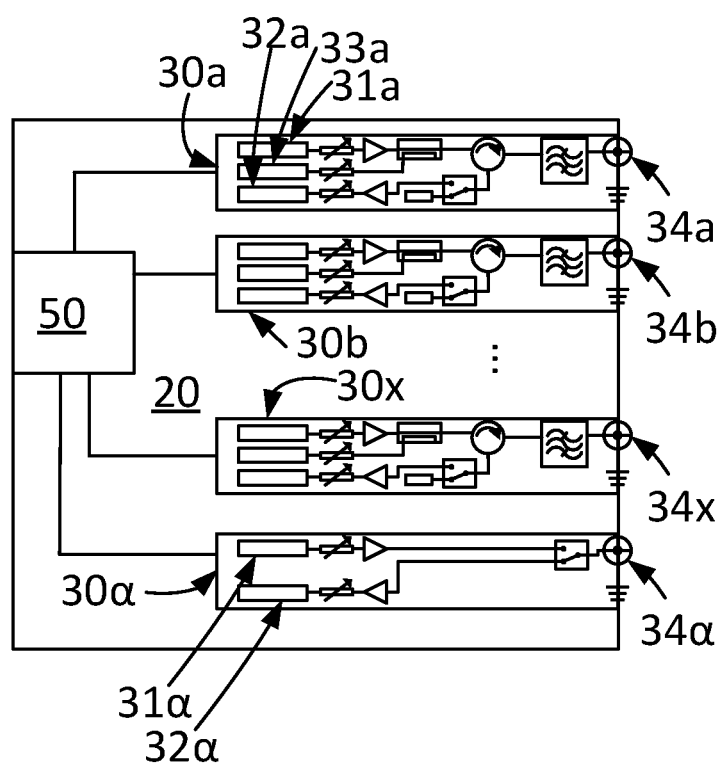
FIG. 2 depicts schematically an embodiment of a radio unit.

FIG. 2 depicts schematically an embodiment of a radio unit 20. It should, however, be emphasised that the AAS 10 according to the present disclosure is by no means restricted to the specific design of this embodiment. The radio unit 20 comprises a plurality of transceiver branches 30a, . . . , 30x. The number of transceiver branches is arbitrary. In one example, the radio unit 20 comprises 32, 64, or 128 transceiver branches. In the depicted embodiment, each transceiver branch has basically the same overall design. As a consequence, only a first transceiver branch 30a will be described in more detail. The first transceiver branch 30a comprises a transmitter 31a. The first transceiver branch 30a comprises a receiver 32a. The first transceiver branch 30a can comprise a transmitter observing receiver, TOR, 33a. An amplifier (not denoted by reference number) can be coupled after the transmitter 31a and/or before the receiver 33a. The terms "after" and "before" relate to the ordinary signal flow in relation to the transceiver and receiver, respectively. The transmitter 31a and the TOR 33a can be connected via a coupler (not denoted by reference number). The transmitter 31a, the TOR 33a, and the receiver 32a can be connected to a transceiver array boundary, TAB, 34a, such as an antenna port, preferably via a frequency filter, such as a bandpass filter (not denoted by reference number). The receiver 32a can be switched to receive mode. The receiver 32a can be switched off.

The radio unit 20 can comprise a calibration branch 30α. The calibration branch 30α comprises a transmitter 31α and/or a receiver 32α. An amplifier might be coupled after the transmitter 31α and/or before the receiver 32α. The transmitter 31α might be coupled or decoupled to a TAB 34α of the calibration branch, such as a calibration port. The receiver 32α might be coupled or decoupled to the TAB 34α.

The radio unit 20 can comprise a digital radio processor 50. The processor 50 is arranged to control operation of the transceiver branches 30a, . . . , 30x and the calibration branch 30α.

It should be emphasised that, for example, the calibration branch 30α is optional. Although the methods described in relation to FIG. 5-6 refer partly to the calibration branch 30α, this is only one possible implementation of the present disclosure. Other implementations do not require a calibration branch 30α.

Figure 3:
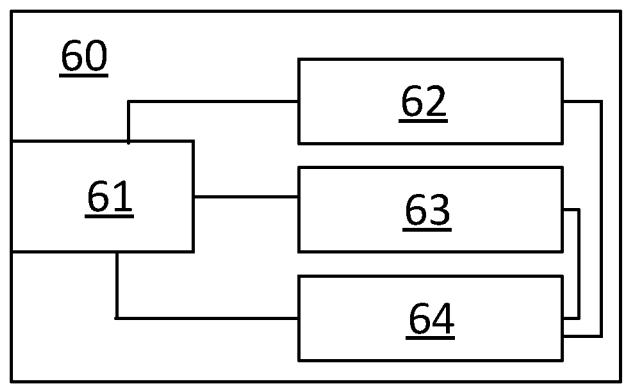
FIG. 3 depicts schematically a factory test bench.

FIG. 3 depicts schematically a factory test bench 60. Although in the remainder of the disclosure referred to as factory test bench 60, the present disclosure does not require that the test bench is placed in a factory or adapted to be used in a factory. The present disclosure would work equally well with any other test bench. The factory test bench 60 can comprise a switch box 61. The factory test bench 60 can comprise a signal generator 62. The factory test bench 60 can comprise a spectrum analyser 63. The factory test bench 60 can comprise a control unit 64. The control unit 64 can comprise a processor. The control unit 64 can comprise a personal computer, PC. The control unit 64, the spectrum analyser 63, and the signal generator 62 are connected to the switch box 61. Preferably, the control unit 64, the spectrum analyser 63, and the signal generator 62 are also directly connected to each other. The switch box 61 is arranged to couple signals to and/or from any of the control unit 64, the spectrum analyser 63, and the signal generator 62. The switch box 61 can be arranged to receive signal(s) from one or more external components. As an example, the switch box 61 can be arranged to receive signal(s) from a transceiver branch of the radio unit 20 and/or the calibration branch 30α of the radio unit 20. The receiving might require a connection to the corresponding TAB of the transceiver and/or calibration branch. The switch box 61 can be arranged to transmit signal(s) to one or more external components. As an example, the switch box 61 can be arranged to transmit signal(s) to a transceiver branch of the radio unit 20 and/or to the calibration branch 30α of the radio unit 20. The transmitting might require a connection to the corresponding TAB of the transceiver and/or calibration branch.

The factory test bench 60 might be especially useful for performing step 110 of method 100 or method 199 in one example of these methods, as will be described later.

FIG. 4a depicts schematically an embodiment of an antenna array 40. The antenna array 40 can comprise an antenna control unit 41. The antenna array 40 is preferably arranged to be part of an AAS 10 together with a corresponding radio unit 20 when connected to the radio unit 20. The antenna array 40 can be time division duplex, TDD, antenna. The antenna array 40 can be a frequency division duplex, FDD, antenna. The antenna array 40 can comprise transceiver array boundaries, TAB, 44a, . . . , 44x, 44α. The TAB 44a, . . . , 44x are arranged to be connected to corresponding TAB 34a, . . . , 34x of the transceiver branches 30a, . . . , 30x of the radio unit. A potential calibration TAB 44α can be arranged to be connected to a corresponding TAB 34α of the calibration branch 30α of the radio unit 20.

The antenna array 40 comprises a plurality of antennae 42a, . . . , 42x. The antennae 42a, . . . , can be connected to a corresponding TAB 44a, . . . , 44x. Preferably, the number of antennae matches the number of transceiver branches of the radio unit 20. The antenna array 40 can comprise a plurality of couplers 43a, . . . , 43x. The couplers 43a, . . . , 43x can be arranged to connect a corresponding TAB 44a, . . . , 44x and/or a corresponding antenna 42a, . . . , 42x to the antenna control unit 41. The antenna control unit 41 can be connected to a potential TAB 44α for the potential calibration branch of the radio unit 20. The antenna control unit 41 can be arranged to couple a signal from the calibration TAB 44α to at least one TAB 44a, . . . , 44x for the transceiver branches. The antenna control unit 41 can be arranged to couple a signal from at least one TAB 44a, . . . , 44x for the transceiver branches to the calibration TAB 44a. The transfer functions between the calibration TAB 44α and the other TAB 44a, . . . , 44x via the antenna control unit 41 can be saved in a memory (not shown). The memory can be an internal memory of the AAS 10 and does not need to be part of the antenna array 40. The memory can be a memory external to the AAS 10.

FIG. 4b depicts schematically an embodiment of an antenna array 40 indicating signal flow. The antenna array 40 of FIG. 4b corresponds to the antenna array 40 of FIG. 4a. FIG. 4b depicts a possible signal flow through the antenna array when step 120 or step 160 is performed, i.e. for calibrating non-calibrated transceiver branches. These steps will be described later in relation to FIG. 5-6. The depicted signal flows 45a, . . . , 45x correspond to signal flows from the calibration TAB 44α to a respective TAB 44a, . . . , 44x for a corresponding transceiver branch of the radio unit. The signal flows 45a, . . . , 45x are preferably bi-directional. The signal flows 45a, . . . , 45x can be simultaneous and/or sequentially. The antenna array can be arranged to allow/provide these signal flows 45a, . . . , 45x.

FIG. 5a depicts a flowchart of an example of a method 100 for calibrating an active antenna system, AAS. The AAS can be the AAS 20 described in relation to FIG. 1. The AAS comprises a radio unit and an antenna array. The radio unit can be the radio unit 20 described in relation to FIG. 1 or 2. The antenna array can be the antenna array 40 in relation to FIG. 1 or FIG. 4a, b. The radio unit comprises a plurality of transceiver branches. The method 100 starts with step 110.

Step 110 comprises calibrating at least one, but less then all, out of the plurality of transceiver branches as reference branch/-es. The method continues with step 120. Step 120 comprises, while the antenna array and the radio unit are connected, calibrating non-calibrated transceiver branch/-es out of the plurality of transceiver branches. After step 120 the method ends. An example of method 100 is described in greater detail in relation to FIG. 5b.

Figure 5B:
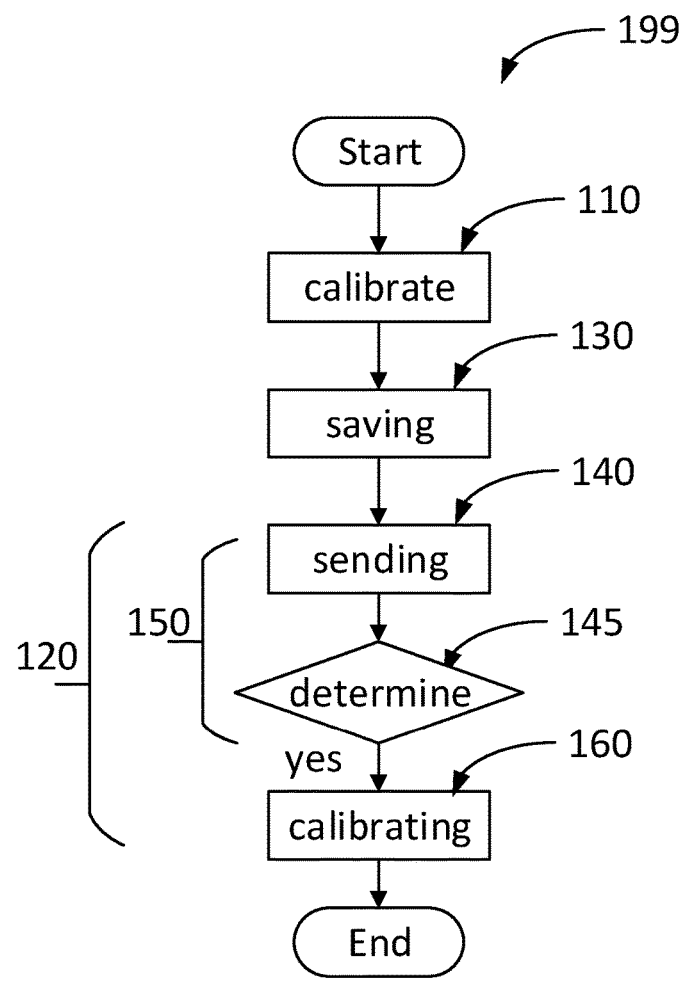
FIG. 5b depicts a flowchart of an example of a method for calibration.

FIG. 5b depicts a flowchart of an example of a method 199 for calibrating an active antenna system, AAS. The method 199 is an example of method 100 described in relation to FIG. 5a.

The method 199 starts with step 110. Step 110 comprises calibrating at least one, but less then all, out of the plurality of transceiver branches as reference branch/-es. This calibration of the reference branch/-es can be performed in any way. In one example, the calibration of the reference branch/-es is according to a prior art solution. In one example, only one branch is used as reference branch. In one example, more than one reference branch is used as reference branch. In principle, any number of reference branches can be used as long as this number is less than the overall number of branches in the plurality of transceiver branches. In the remainder of the description of method 199 it is assumed that only one reference branch is used. As an example, transceiver branch 30a acts as reference branch. However, the method 199 works equally well with any other number of reference branches.

In one example, step 110 comprises connecting a (factory) test bench to the radio unit. This can be a factory test bench as described in relation to FIG. 3. As an example, the switch box 61 of the factory test bench 60 is connected to the TAB 34α of the calibration branch 30α and/or to the TAB 34a of the transceiver branch 30a. The transceiver branch 30a can then be calibrated as reference branch, for example according to prior art. In one example, the calibration of the transceiver branch 30a comprises calibration of the transmitter 31a of the transceiver branch 30a. In one example, the calibration of the transceiver branch 30a comprises calibration of the receiver 32a of the transceiver branch 30a. In one example, the calibration of the transceiver branch 30a comprises calibration of the TOR 33a of the transceiver branch 30a. Preferably, the transmitter 31a, the receiver 32a, and the TOR 33a of the transceiver branch 30a are calibrated. As an example, the receiver 32a is calibrated based on received signals from the signal generator 62 of the factory test bench 60. As an example, the transmitter 31a is calibrated by the spectrum analyser 63 of the factory test bench 60.

Step 110 is in one example performed while the antenna array 40 and the radio unit 20 are not connected. This facilitates connection of the factory test bench 60. In one example, step 110 is performed while the antenna array 40 and the radio unit 20 are connected. This is especially useful in case a re-calibration is performed, for example when the AAS is installed in a base station on the field. In this case, step 110 can comprise determining at least one transceiver branch as reference branch. In one example, a previously calibrated transceiver branch is determined as reference branch. In one example, several transceiver branches are tested according to their performance and the reference branch is determined based on the performance test.

Step 110 can comprise testing the reference branch 30a. The testing of the reference branch 30a can comprise sending signals from the reference branch 30a to the factory test bench 60 and/or to the calibration branch 30a. The testing of the reference branch 30a can comprise analysing the sent signal from the reference branch 30a by the factory test bench 60 and/or the calibration branch 30α. The testing of the reference branch 30a can comprise sending signals from the factory test bench 60 and/or the calibration branch 30α to the reference branch 30a. The testing of the reference branch 30a can comprise analysing the sent signal from the factory test bench 60 and/or the calibration branch 30α by the reference branch 30a. The testing of the reference branch 30a can comprise an analysis of the output power of the transmitter 31a. The testing of the reference branch 30a can comprise an analysis of the adjacent channel leakage ratio, ACLR. The testing of the reference branch 30a can comprise an analysis of the error vector magnitude, EVM. The testing of the reference branch 30a can comprise an analysis of the power consumption of the reference branch. The analysis of any of these quantities/parameters can comprise determining these quantities/parameters. The analysis of any of these quantities/parameters can comprise determining these quantities/parameters under a specific state of operation of the AAS.

The method continues with the optional step 130.

The optional step 130 comprises saving information regarding properties of the radio unit obtained during the step 110 of calibrating the reference branch. The information regarding properties of the radio unit can relate to a variable gain amplifier linearity, VGA linearity of a receiver, preferably in each reference branch. The information regarding properties of the radio unit can relate to a gain of a receiver, preferably in each reference branch. The information regarding properties of the radio unit can relate to a frequency response of the receiver, preferably in each reference branch. The information regarding properties of the radio unit can relate to parameters regarding amplitude, time, and/or phase of the automatic gain control, AGC. The information regarding properties of the radio unit can relate to a VGA linearity of a transmitter, preferably in each reference branch. The information regarding properties of the radio unit can relate to a gain of the transmitter, preferably in each reference branch. The information regarding properties of the radio unit can relate to a frequency response of a transmitter, preferably in each reference branch. The information regarding properties of the radio unit can relate to a gain of the transmitter observing receiver, TOR, preferably in each reference branch. The information regarding properties of the radio unit can relate to the frequency response of the TOR, preferably in each reference branch.

The saved information can comprise any of the following quantities/parameters: output power of the transmitter 31a of the reference branch 30a, ACLR, EVM, and/or power consumption of the reference branch 30a. The method continues with the step 120. The saving can be on a memory (not shown) of the AAS 10. The memory can be located inside the AAS 10. The memory can be external to the AAS 10.

Step 120 comprises, while the antenna array 40 and the radio unit 20 are connected, calibrating non-calibrated transceiver branch/-es out of the plurality of transceiver branches. In case the antenna array 40 and the radio unit 20 are not connected yet, such a connection can be performed prior performing step 120. As an example, the transceiver array boundaries 34a, 34b, ..., 34x, 34α, TAB 34a, 34b, ..., 34x, 34α, of the transceiver branches 30a, 30b, ..., 30x, 30α are connected to the corresponding TAB 44a, 44b, ..., 44x, 44α, of the antenna array 40.

The number of non-calibrated transceiver branches is an arbitrary positive integer number. In the following, it will be assumed that the non-calibrated transceiver branches correspond to transceiver branches 30b, ..., 30x. As an example, the number of non-calibrated transceiver branches might be 63 in case an AAS with 64 transceiver branches, excluding a potential calibration branch, is used.

Step 120 can comprise step 150 of determining whether the radio unit 20 and the antenna array 40 are properly connected.

Step 150 can comprise step 140 of sending a test signal between the calibration branch 30α and the reference branches 30b, ..., 30x. In one example, step 140 comprises sending a test signal from the transmitter 31α of the calibration branch 30α. The sending of the test signal can be performed at a pre-determined power level $P_{TC}$ of the transmitter 31α of the calibration branch 30α.

Step 150 can comprise step 145 of determining whether the radio unit 20 and the antenna array 40 are properly connected based on that sent test signal. Step 145 can comprise receiving the sent signal by the receiver 32a of the reference branch 30a. Step 145 can comprise determining the power level $P_{R1}$ of the received sent signal at the receiver 32a of the reference branch 30a. Step 145 can comprise determining the close loop gain $G_{TC\_R1}$ from the transmitter 31α of the calibration branch 30α to the receiver 32a of the reference branch 30a. The close loop gain can be determined as the difference between the two power levels, i.e. $G_{TC\_R1}=P_{R1}-P_{TC}$. Step 145 can comprise determining whether the close loop gain differs more than a pre-determined threshold from corresponding gain(s) during calibration of the reference branch. In one example, it is determined whether the close loop gain differs more than a pre-determined threshold from corresponding gain(s) which have been saved in step 130. As an example, it is determined whether the expression $G_{TC\_CAL}+G_{CAL\_TAB1}+G_{TAB1\_R1}-G_{TC\_R1}$ is lower than the pre-determined threshold. In this expression, $G_{TC\_CAL}$ denotes the gain from the transmitter 31α of the calibration branch 30α to the calibration port, i.e. TAB 34α, $G_{CAL\_TAB1}$ denotes the gain from the calibration port, i.e. TAB 34α, to the TAB 34a of the reference branch 30a, and $G_{TAB1\_R1}$ and denotes the gain from the TAB 34a of the reference branch 30a to the receiver 32a of the reference branch 30a. The pre-determined threshold can depend on the required product quality. In one example, the pre-determined threshold is 0.5 dB. In one example it is determined that the radio unit 20 and the antenna array 40 are properly connected in case the difference between the close loop gain and the corresponding gain(s) during calibration and/or the corresponding saved gain(s) is below the pre-determined threshold. In one example it is determined that the radio unit 20 and the antenna array 40 are not properly connected in case the difference between the close loop gain and the corresponding gain(s) during calibration and/or the corresponding saved gain(s) is not below the pre-determined threshold. The determining of the proper connection can in principle be performed in any other way as well.

Step 120 can comprise step 160 of calibrating the non-calibrated transceiver branches 30b, . . . , 30x in case it has been determined that the radio unit 20 and the antenna array 40 are properly connected. The specifics of how this calibration is implemented in practice will usually depend on which parts of the transceiver branches 30b, . . . , 30x should be calibrated and/or which properties of the transceiver branches 30b, . . . , 30x should be calibrated. In one example all non-calibrated transceiver branches are calibrated basically simultaneously. This is especially suitable in case only power needs to be measured. This will lead to reduced calibration time. An example is given below in relation to calibration of transmitters. In one example, the non-calibrated transceiver branches are calibrated sequentially, i.e. branch by branch. This is especially suitable in case much data needs to be determined for calibration. However, the specific implementation whether the calibration can be performed simultaneously or sequentially might depend on the specific hardware design of the AAS 10.

In one example, step 160 comprises calibrating the transmitters 31b, . . . , 31x of the non-calibrated transceiver branches 30b, . . . , 30x. The calibrating can comprise sending a signal from all transmitters 31a, . . . , 31x of the transceiver branches 30a, . . . , 30x, i.e. including the both the calibrated transceiver branch 30a and the non-calibrated transceiver branches 30b, . . . , 30x. The sending is in one example performed basically simultaneously from all transmitters 31a, . . . , 31x of the transceiver branches 30a, . . . , 30x, i.e. $P_{TX} = [P_{Ta}, P_{Tb}, \ldots, P_{Tx}]$, wherein $P_{TX}$ denotes the total transmitted power and $P_{Ta}$ the transmitted power of transceiver branch 30a, $P_{Tb}$ the transmitted power of transceiver branch 30b, and so on. The sent signal can be orthogonal signals. Herein, the term orthogonal can relate to the fact that signals from different branches do basically not interfere with each other. The calibrating can comprise receiving all the sent signals by the calibration receiver 32α, for example $P_{RC} = [P_{RCa}, P_{RCb}, \ldots, P_{RCx}]$, wherein $P_{RC}$ denotes the total received power by the calibration receiver 32α, $P_{RCa}$ denotes the received power from transceiver branch 30a, $P_{RCb}$ denotes the received power from transceiver branch 30b, and so on. The calibrating can comprise determining the transmitter gains $G_{Tb}, \ldots, G_{Tx}$ of the transmitters 31b, . . . , 31x of the un-calibrated transceiver branches 30b, . . . , 30x, for example based on the received power. This is in one example performed via calculating $G_{TX} = [G_{Ta}, G_{Tb}, \ldots, G_{Tx}] = P_{RC} - P_{TX} - G_{TAB\_RC} - G_{TABX)CAL}$, wherein $G_{TAB\_RC}$ denotes the calibration receiver gain from the TAB to the calibration receiver and $G_{TABX\_CAL}$ the gain from the TAB to the calibration point. The determined transmitter gains are in one example saved in a memory.

Above, an example has been given regarding how to determine the transmitter gains of the non-calibrated transceiver branches. Even other properties of transmitters might be determined. Different schemes can be developed for all properties to be determined in relation to the non-calibrated transmitters.

In one example, step 160 comprises calibrating the receivers 32b, . . . , 32x of the non-calibrated transceiver branches 30b, . . . , 30x. The calibration can comprise sending a signal from the calibration transmitter 31α. The calibration can comprise receiving the sent signal by the receivers 32a, . . . , 32x of the non-calibrated transceiver branches 30b, . . . , 30x and preferably also the reference branch 30a. The calibration can comprise determining properties of the non-calibrated receivers 32a, . . . , 32x based on the received signal.

In one example, calibrating the receivers 32b, . . . , 32x of the non-calibrated transceiver branches 30b, . . . , 30x comprises calibrating the automatic gain control, AGC, of the receivers 32b, . . . , 32x of the non-calibrated transceiver branches 30b, . . . , 30x. In one example, calibrating AGC comprises calibrating amplitude and/or phase and/or timing of the AGC. In one example, calibrating the AGC comprises transmitting a continuous wave, CW, signal from the transmitter 31α of the calibration branch 30α to the calibration port, i.e. TAB 44α, of the antenna array 40. The calibrating of the AGC can further comprise coupling the CW signal to transceiver branches 30a, . . . , 30x, for example via the corresponding couplers 43a, . . . , 43x of the antenna array 40. The calibration can comprise switching between preferably all the different states $state_0, state_1, state_2, \ldots, state_z$ of the AGC and preferably recording power $P_n$ and phase $\varphi_n$ for each state n out of the total number M=z+1 of states. The power $P_n$ and the phase $\varphi_n$ is preferably recorded by all non-calibrated receivers 32b, . . . , 32x. The amplitude differences $G_{COMn}$ and the phase differences $P_{COMn}$ might then be determined via $$G_{COMn} = 10 \cdot \log\left(\frac{P_n}{P_0}\right) \text{ and}$$

$$P_{COMn} = \frac{180}{\pi} \cdot (\varphi_n - \varphi_0) \mod 360,$$

respectively. From this, a gain compensation value $A_{COMP}$ and/or a phase compensation value $P_{COMP}$ might be determined, for example via $A_{COMP} = [0, G_{COM1}, \ldots, G_{COMM}]$ and/or $P_{COMP} = [0, P_{COM1}, \ldots, P_{COMM}]$.

Such gain compensation value $A_{COMP}$ and/or a phase compensation value $P_{COMP}$ might be determined for each non-calibrated transceiver branch, i.e. $A_{COMPb}$ for transceiver branch 30b, $A_{COMPc}$ for transceiver branch 30c, and so on.

Some specific examples have been given above regarding how the non-calibrated transceiver branches can be calibrated. It should be emphasised that step 160 is not restricted to these specific examples but can instead be used for calibrating many other parts and/or properties of the non-calibrated transceiver branches.

Step 160 can comprise calibrating different parts and/or properties of the non-calibrated transceiver branches after each other. Step 160 can comprise calibrating different parts and/or properties of the non-calibrated transceiver branches in parallel.

After step 120, the method 199 ends. It should be emphasised that method 199 can be used for calibrating in connection to the production of the AAS 10, as well as later on, for example for re-calibration, when the AAS 10 is installed "on the field" and operating.

Figure 6:
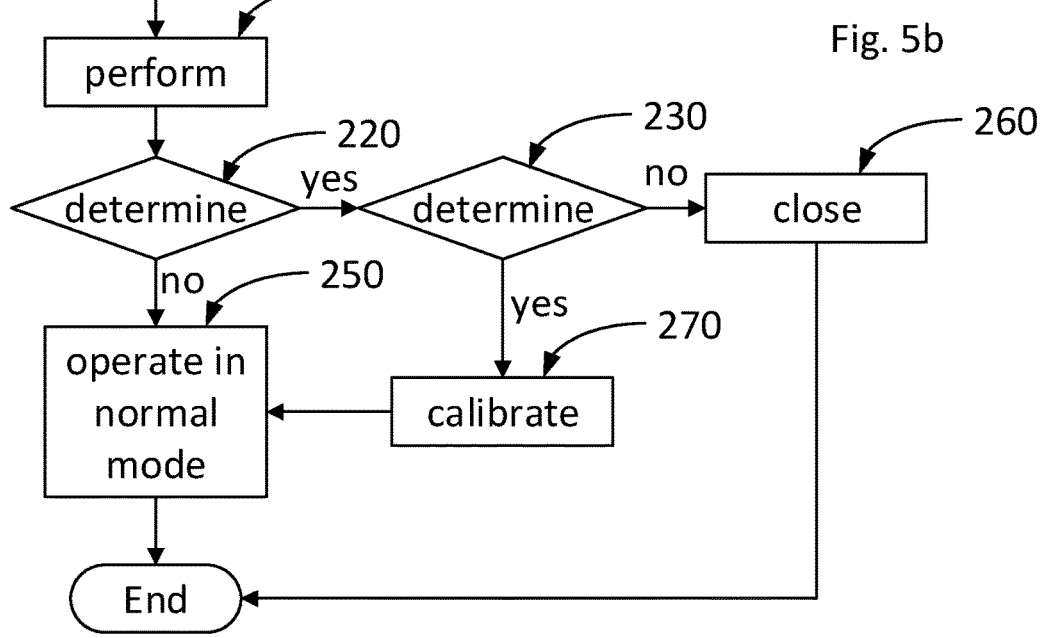
FIG. 6 depicts a flowchart of an example of a method for automatic maintenance.

FIG. 6 depicts a flowchart of an example of a method 200 for onsite automatic maintenance of an active antenna system, AAS. The AAS can, for example, be the AAS 10 described earlier in this disclosure. The method 200 is preferably performed while the AAS 10 is installed "on the field", i.e. in an environment intended for normal operation. The method 200 starts with step 210.

Step 210 comprises performing a self-test of the AAS. In principle, the AAS self-test can be performed in any suitable way. Step 210 can comprise determining a set of properties of the AAS. Step 210 can comprise determining whether the determined set of properties deviates more than a pre-determined threshold/set of thresholds from a corresponding set of properties obtained during calibration of the AAS. As an example, the determined set of properties can be compared to the corresponding properties which have been saved in step 130 of a calibration method 199 in connection to the production of the AAS 10.

In one example, step 210 comprises determining the error vector magnitude, EVM. In the following, it is assumed that transceiver branch 30a acted as reference branch during calibration of the AAS 10, which corresponds to the situation described in relation to method 100 and method 199. However, it should be understood that in principle any transceiver branch/-es might have been chosen as reference branch/-es and that the following description then easily could be adapted to refer to this/these chosen reference branch/-es instead. During calibration, the $EVM_{Ta\_SG}$ of the transmitter 31a of the reference branch 30a can be determined during calibration of the reference branch 30a, for example while the factory test bench 60 is connected to the radio unit 20, wherein Ta stands for transmitter 31a and SG stands for the signal generator 62. Further, the $EVM_{Ta\_CR}$ of the transmitter 31a of the reference branch 30a can be determined while the calibration receiver 32α is connected to the transmitter 31a, wherein CR relates to the calibration receiver. From these values a calibration receiver contribution of the EVM can be calculated, i.e. $EVM_{CR}$, for example according to $EVM_{CR}=\sqrt{(EVM_{Ta\_SG}^2+EVM_{Ta\_CR}^2)}$. An EVM-limit for a transceiver of any of the transceiver branches 30a, ..., 30x when using the calibration receiver, i.e. $EVM_{TH\_CR}$, can be determined. In one example, this is performed via $EVM_{TH\_CR}=\sqrt{(r^2+EVM_{CR}^2)}$, wherein r denotes a pre-determined EVM-requirement and wherein TH indicates a threshold. Step 210 can comprise determining the EVM of the transmitters 31a, ..., 31x, i.e. $EVM_{TX\_CR}$, in preferably all the transceiver branches 30a, ..., 30x when the calibration receiver is used, i.e. $EVM_{TX\_CR}=[EVM_{T1\_CR}, EVM_{T2\_CR}, ..., EVM_{T64\_CR}]$.

In one example, step 210 comprises determining at least one property of the AAS 10 which has been previously determined during a calibration method and which preferably has been saved for later reference. After step 210, the method 200 continues with step 220.

Step 220 comprises determining whether the active antenna system 10 deviates from normal operation based on the self-test. Step 220 comprises in one example comparing at least one property of the AAS 10 which has been determined during the self-test with the corresponding property which has been previously determined during a calibration method, for example with a corresponding property which has been saved for later reference. In one example, it is determined that the AAS 10 deviates from normal operation in case at least one property of the AAS 10 determined during the self-test deviates more than a pre-determined threshold from the corresponding property which has been previously determined during a calibration method. In one example, it is determined that the AAS 10 deviates not from normal operation in case at least one property of the AAS 10 determined during the self-test deviates not more than a pre-determined threshold from the corresponding property which has been previously determined during a calibration method. As an example, step 220 might comprise comparing $EVM_{Tx\_cR}$ and $EVM_{TH\_CR}$. Step 220 might comprise determining whether $EVM_{TX\_CR}$ and $EVM_{TH\_CR}$ deviate more than a pre-determined threshold.

Step 220 can comprise performing the comparison for individual transceiver branches. As an example, step 220 can comprise determining for several and preferably all transceiver branches whether $EVM_{TX\_CR}$ and the respective value of $EVM_{TH\_CR}$ for the transceiver branch deviates more than a pre-determined threshold. Step 220 can comprise determining whether a specific transceiver branch deviates from normal operation.

In case it has been determined that the AAS 10 does not deviate from normal operation, the method continues with step 250. In case it has been determined that the AAS 10 does deviate from normal operation, the method continues with step 230.

Step 250 comprises operating the AAS 10 in normal operation mode. After step 250 the method 200 ends.

Step 230 comprises determining whether a recalibration of the active antenna system 10 can bring the active antenna system 10 back to normal operation. Step 230 can comprise determining whether at least one property of the AAS 10 determined during the self-test deviates more than a pre-determined second threshold from the corresponding property which has been previously determined during a calibration method. As an example, it is determined that the recalibration of the active antenna system 10 can bring the active antenna system 10 back to normal operation in case the deviation is below the second pre-determined threshold. As an example, it is determined that the recalibration of the active antenna system 10 cannot bring the active antenna system 10 back to normal operation in case the deviation is not below the second pre-determined threshold. The second pre-determined threshold is preferably larger than the corresponding pre-determined threshold from step 220. Step 230 can comprise determining whether the number of transceiver branches which does deviate from normal operation is below a pre-determined threshold. In case the number of transceiver branches which does deviate from normal operation is below a pre-determined threshold, it might be determined that a recalibration of the active antenna system 10 can bring the active antenna system 10 back to normal operation. In case the number of transceiver branches which does deviate from normal operation is not below the pre-determined threshold, it might be determined that a recalibration of the active antenna system 10 cannot bring the active antenna system 10 back to normal operation.

In case it is determined that a recalibration of the active antenna system can bring the active antenna system 10 back to normal operation, the method continues with step 270. In case it is determined that a recalibration cannot bring the active antenna system 10 back to normal operation, the method continues with step 260.

Step 270 comprises (re-)calibrating the active antenna array system 10. The calibration is performed according to method 100 and/or method 199 described above. After step 270 the method continues with step 250.

Step 260 comprises closing at least one transceiver branch of the active antenna system 10. As an example, all transceiver branches for which it is determined that a calibration cannot bring them back to normal operation are closed. This will usually affect the performance of the AAS 10. However, in case the AAS 10 has a comparably high number of transceiver branches, for example 64 transceiver branches, and the number of closed transceiver branches is low, for example, 1, the overall performance of the AAS will not be affected too much, for example roughly by only one to two percent in the above example (1/64≈1.6). The term closing can refer to a shutting down of the transceiver branch. The term closing can relate to no longer transferring power and/or data to the transceiver branch. After step 260 the method ends. The AAS 10 might continue normal operation with the non-closed transceiver branches and no operation with the closed transceiver branches.

In one example, the method 200 comprises determining whether a main failure occurs. A main failure might have occurred if the number of closed transceiver branches is above a pre-determined threshold and/or if the deviation of a specific parameter of the AAS 10, for example a parameter not relating to a specific transceiver branch, deviates more than a third pre-determined threshold from a corresponding parameter obtained during calibration of the AAS. A main failure might relate to a hardware failure relating to all transceiver branches, such as a failure in a direct current, DC, supply. Determining whether a main failure occurs can be performed after step 260 and/or after step 220. In case it is determined that a main failure has occurred, the method 200 can continue by shutting down the whole AAS 10 and preferably calling for a repair. It should be emphasised that the shutting down of the whole AAS 10 usually only occurs in exceptional cases. If a deviation from normal operation is determined, a recalibration according to step 270 and/or a closing according to step 260 will usually bring the AAS 10 in a controlled operation mode again, without the need for (immediate) service. Thus, although faults in a transceiver branch might occur, this will usually not prevent the AAS 10 from operating in a reasonable well condition.

Method 200 is in one example performed according to a pre-determined schedule. Method 200 is in one example performed in case it is determined that basically no traffic is transmitted via the AAS 10. Method 200 is in one example performed in case a problem indication has been reported by the AAS 10.

LIST OF ABBREVIATIONS

AAS Active antenna system
ACLR Adjacent channel leakage ratio
AGC Automatic gain control
CAL Calibration
CW Continuous wave
DC Direct current
EVM Error vector magnitude
FDD Frequency division duplex
HW Hardware
LTE Long-term evolution
RX Receiver
SG Signal generator
TAB Transceiver array boundary
TOR Transmitter observing receiver
TX Transmitter

LIST OF REFERENCES

10 Antenna array system, AAS
20 Radio unit
30a, 30b, . . . , 30x Transceiver branch
30α Calibration branch
31a, 31b, . . . , 31x, 31α Transmitter
32a, 32b, . . . , 32x, 32α Receiver
33a, 33b, . . . , 33x Transmitter observing receiver, TOR
34a, 34b, . . . , 34x, 34α Transceiver array boundary, TAB
40 Antenna array
41 Antenna control unit
42a, 42b, . . . , 42x Antenna
43a, 43b, . . . , 43x Coupler
44a, 44b, . . . , 44x, 44α Transceiver array boundary, TAB
45a, 45b, . . . , 45x Signal transmission
50 Digital radio processor
60 (Factory) test bench
61 Switch box
62 Signal generator
63 Spectrum analyser
64 Control unit

The invention claimed is:

1. A method for calibrating an active antenna system comprising a radio unit and an antenna array, wherein the radio unit comprises a plurality of transceiver branches and a calibration branch, the method comprising:
    calibrating at least one, but less then all, out of the plurality of transceiver branches as reference branch or branches;
    determining whether the radio unit and the antenna array are properly connected by sending a test signal between the calibration branch and the reference branch or branches;
    in response to determining that the antenna array and the radio unit are properly connected, calibrating non-calibrated transceiver branch or branches out of the plurality of transceiver branches.

2. The method according to claim 1, further comprising:
    saving information regarding properties of the radio unit obtained during calibrating of the reference branch or branches;
    and wherein the determining whether the radio unit and the antenna array are properly connected is also based on the saved information regarding properties of the radio unit.

3. The method according to claim 2, wherein the information regarding properties of the radio unit relates to one or more of the following quantities: variable gain amplifier (VGA) linearity of a receiver in each reference branch, gain of the receiver in each reference branch, frequency response of the receiver in each reference branch, parameters regarding one or more of amplitude, time, and phase of an automatic gain control (AGC), VGA linearity of a transmitter in each reference branch, gain of the transmitter in each reference branch, frequency response of the transmitter in each reference branch, gain of a transmitter observing receiver (TOR) in each reference branch, and the frequency response of the TOR in each reference branch.

4. The method according to claim 1, wherein the calibrating each reference branch is performed while the antenna array and the radio unit are not connected.

5. A method for onsite automatic maintenance of an active antenna system comprising a radio unit and an antenna array, wherein the radio unit comprises a plurality of transceiver branches, the method comprising:
    performing a self-test of the active antenna system;
    determining whether the active antenna system deviates from normal operation based on the self-test;
    in response to determining that the active antenna system deviates from normal operation, determining whether a recalibration of the active antenna system can bring the active antenna system back to normal operation; and in response to determining that the recalibration of the active antenna system can bring the active antenna system back to normal operation, calibrating the active antenna system by:

calibrating at least one, but less then all, out of the plurality of transceiver branches as reference branch or branches; and while the antenna array and the radio unit are connected, calibrating non-calibrated transceiver branch or branches out of the plurality of transceiver branches.

6. The method according to claim 5, further comprising:

in response to determining that a recalibration of the active antenna system cannot bring the active antenna system back to normal operation, closing at least one transceiver branch of the active antenna system.

7. An active antenna system comprising:

an antenna array; and a radio unit comprising a plurality of transceiver branches, wherein the active antenna system being configured to perform onsite automatic maintenance by performing operations to:

perform a self-test of the active antenna system;

determine whether the active antenna system deviates from normal operation based on the self-test;

in response to a determination that the active antenna system deviates from normal operation, determine whether a recalibration of the active antenna system can bring the active antenna system back to normal operation; and in response to a determination that the recalibration of the active antenna system can bring the active antenna system back to normal operation, calibrate the active antenna array system by performing operations to:

calibrate at least one, but less then all, out of the plurality of transceiver branches as reference branch or branches; and while the antenna array and the radio unit are connected, calibrate non-calibrated transceiver branch or branches out of the plurality of transceiver branches.

8. The active antenna system according to claim 7, further comprising:

in response to a determination that the recalibration of the active antenna system cannot bring the active antenna system back to normal operation, closing at least one transceiver branch of the active antenna system.

\* \* \* \* \*